United States Patent [19]
Smeets

[11] 3,788,785
[45] Jan. 29, 1974

[54] METHOD AND APPARATUS FOR PREHEATING AN UNCURED RUBBER TIRE

[75] Inventor: Joseph Gerard Alphons Smeets, Maastricht, Netherlands

[73] Assignee: International B.F. Goodrich Europe B.V., The Hague, Netherlands

[22] Filed: July 5, 1972

[21] Appl. No.: 269,149

[30] Foreign Application Priority Data
July 10, 1971 Germany............................ 2134525

[52] U.S. Cl.................... 425/32, 425/384, 425/445
[51] Int. Cl.............................................. B29h 5/02
[58] Field of Search.......... 425/28, 38, 384, 445, 32

[56] References Cited
UNITED STATES PATENTS
3,645,660  2/1972  Hugger et al. ....................... 425/445
3,712,769  1/1973  Cimprich .............................. 425/28

Primary Examiner—J. Howard Flint, Jr.
Attorney, Agent, or Firm—W. A. Shira, Jr.

[57] ABSTRACT

An apparatus for preheating an uncured elastomer-containing pneumatic tire before vulcanization. The preheating means comprises a chamber supported for movement to and from an uncured tire mounted and shaped in a vulcanizing press so that preheating can occur after tire-shaping and before vulcanization. Preferably, the chamber is divided by partition means to provide different zones of preheating for different portions of a tire with an ultra-high frequency energy emitter means in each zone. The apparatus comprises a vulcanizing press with separable tire molding portions, means to support an uncured tire in a hollow, generally cylindrical configuration between the molding portions and shape the tire to a generally toroidal configuration while the molding portions remain spaced from the tire, the preheating means being movable to and from enclosing relationship with a least a portion of the toroidally shaped tire, and the molding means being movable into engagement with the preheated tire.

10 Claims, 7 Drawing Figures

METHOD AND APPARATUS FOR PREHEATING AN UNCURED RUBBER TIRE

BACKGROUND OF THE INVENTION

It is already known to impart a generally toroidal configuration to the hollow cylindrical uncured tire blanks of bias carcass tires by moving the beads of a blank toward each other. Subsequently, a heating or curing bag is inserted into the interior of the shaped blank which is then given the desired profile and vulcanized in a steam heated press.

It is also known to preheat the blanks in a specially built apparatus before they are placed in the vulcanizing press. In that manner, the various portions of the blanks are subjected to varying degrees of preheating according to their heat requirements. Following the preheating, the blanks are taken from the preheating apparatus and transferred to the vulcanizing press. This has the disadvantage that the preheated blanks lose, during that transfer, some of the heat they have previously received. In addition, special devices to perform that transfer into the curing press must be provided.

It is also known in the art to employ a press which both imparts the generally toroidal shape and vulcanizes the tire blanks. Such a press conventionally includes a bladder and two bead holders that move towards and away from each other to accommodate the beads of a blank that is still in the shape of a hollow cylinder when introduced into the press. As is well known, the motion of the bead holders toward each other and the influence of the bladder causes the blank to take on the rounded shape. Thereafter, portions of a vulcanizing mold, arranged concentrically to the bead holders, engage the blank in order to vulcanize it. When opening the curing mold, the blank is first lifted with the top portion of the mold and subsequently, by virtue of a relative motion of the upper holder, in relation to the top portion of the curing mold, the tire is squeezed out of the press.

The above device actually represents a combination of a shaping apparatus and a curing press, but it does not feature a contrivance to preheat the blank placed in it. It is, of course, possible to preheat the blank in a separate device before putting it in such a combined apparatus. Under certain conditions, however, such a separate preheating operation would bring about the disadvantages previously mentioned. Even greater drawbacks are experienced if a blank that has not been preheated at all is placed in a bladder type vulcanizer because then the tire blank would have to remain longer in the vulcanizer and a greater flow resistance must be overcome. When closing the parts of the mold, as a consequence, the press shall not be utilized efficiently and it must have a sturdier construction to withstand the greater forces.

SUMMARY OF THE INVENTION

The purpose of this invention is to create a device for the toroidal shaping and vulcanizing of an uncured elastomer-containing tire blank whereby the disadvantages of the familiar apparatuses are avoided and it becomes possible to eliminate any transfer of the blank from the preheating to the vulcanizing operation, with the consequent loss of heat, and also to reduce considerably the time in which the blank must remain in the vulcanizing press.

To resolve these problems, the invention proposes an apparatus which introduces between those portions of the vulcanizing mold, which are separable from each other for tire loading and unloading, a preheating device which at least partially surrounds a tire blank that has been shaped to the toroidal configuration and is being held by the holders.

In such a device it is merely necessary to fasten the tire blank to the holders of the tire shaping device. After the shaping operation, the blank is preheated in the terminal position it has reached by then. Without again changing its position, the blank is vulcanized at the same location. According to this invention, therefore, the toroidal shaping, the preheating and the vulcanization, which in the past required at least two different and separate pieces of equipment, can now be done with one single apparatus. This means that the generally cylindrically shaped blank is simply placed in one apparatus and upon completion of the vulcanization is removed from it in its finished molded condition. Therefore, there is no need for the moving of the still unvulcanized blank with a possible lowering of the temperature that was attained during the preheating and an energy loss by the time the blank reaches the curing press.

The invention further provides for the preheating apparatus to be equipped with one or more suppliers of ultra-high frequency energy. In this manner, the preheating of the blank is accomplished in a very short time which contributes to a shortening of the overall time required to produce a tire.

Another aspect of this invention is that the preheating chamber is subdivided into various compartments, namely, one for each zone of the blank to be preheated by means of one or more intermediate walls that are impervious to ultra-high frequency energy, whereby a separate supplier of that energy empties into each separate compartment in order to provide varied amounts of that energy. By virtue of such a construction, each portion of the blank can be given the optimum degree of preheating according to the volume and material characteristics of each portion so that it becomes possible to preheat the thick portions of the blanks which require the maximum heat to near the vulcanization temperature without thereby overheating, in the preheating or in the vulcanization, the thin portions of the blank which require a smaller amount of heat. Then, by providing a uniform degree of heat within the vulcanizing press, it is possible to cure, in the shortest time, a blank that has been preheated in this fashion, since the partial zones which have required a maximum of preheating are brought up to the vulcanization temperature simultaneously with those portions of the blank which have been preheated the least and which require less heat during vulcanization. Consequently, the same degree of vulcanizing temperature is reached in all parts of the blank when the curing period ends.

The design of the preheating chamber, in accordance with this invention, offers the further advantage that a relatively smaller amount of flow-resistance of the material in the tire has to be overcome during the vulcanization and, therefore, the curing press can also be of a lighter construction.

The invention further provides for the preheating chamber to consist of two relatively movable parts hinged to swing around an axis running parallel to the axis of the tire. This particular design facilitates the placing of the blank to be preheated into the preheating chamber and removal of the chamber during vulcanization.

The invention also proposes that the intermediate wall or walls, respectively, be arranged concentrically around the axis of the tire. The intermediate wall or walls extend preferably from the end walls of the preheating chamber and terminate immediately below or above, respectively, the outer surface of the tire blank in the chamber. In this manner, a suitable subdivision by compartments is possible with a sufficient interval between each zone.

An additional feature of this invention is that the preheating apparatus embodies a preheating chamber shaped like a box, with the said preheating chamber movable radially in relation to the axis of the blank held by the tire holders, the preheating chamber, on the side facing the blank being provided with an opening that permits the housing to be received about a portion of the tire, with a minimum space between the tire and housing.

This kind of design of the apparatus shortens the distances which have to be covered in order to surround and to release a blank, thus the operation is quicker. Besides, with this design, it is no longer necessary to reserve some space alongside of the device as would be required if one were using a preheating chamber made of two parts connected together by hinges.

Another design feature of this apparatus, in accordance with this invention, is that the length of the opening of the chamber can be adjusted to conform with the diameter of the blank, so that the same chamber can be used for blanks of different diameters.

Finally, in this embodiment of the invention, the side of the preheating chamber facing the blank shall feature two members movable towards each other for the purpose of partially closing the opening in that chamber which make it possible in a simple manner to adjust the length of that opening to the diameter of the blank.

Two embodiments of the invention are hereinafter specifically described, with the aid of the accompanying drawings.

DETAILED DESCRIPTION

Figure 1:
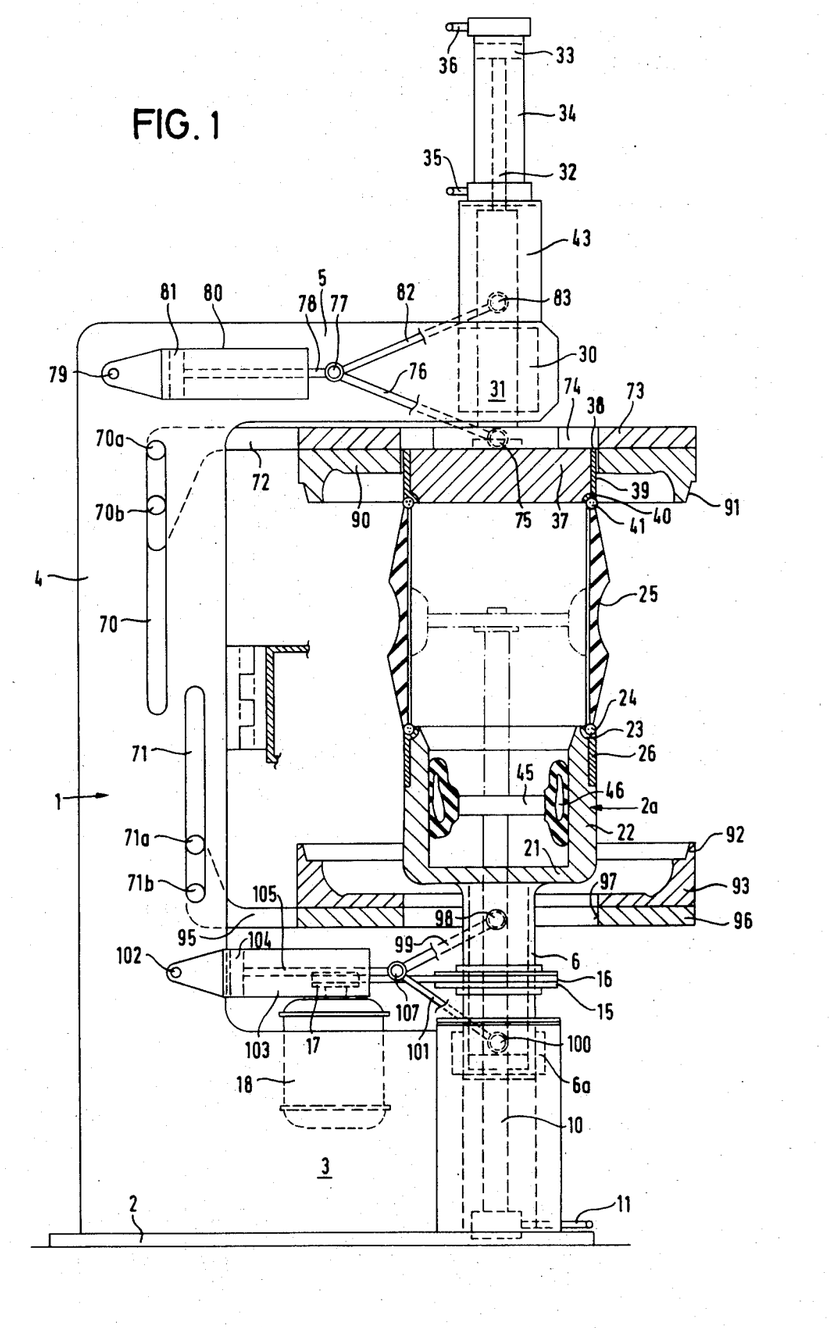
FIG. 1 is a view partially in side elevation and partially in section of one apparatus embodying this invention for shaping and vulcanizing a hollow cylindrical tire blank.
Figure 2:
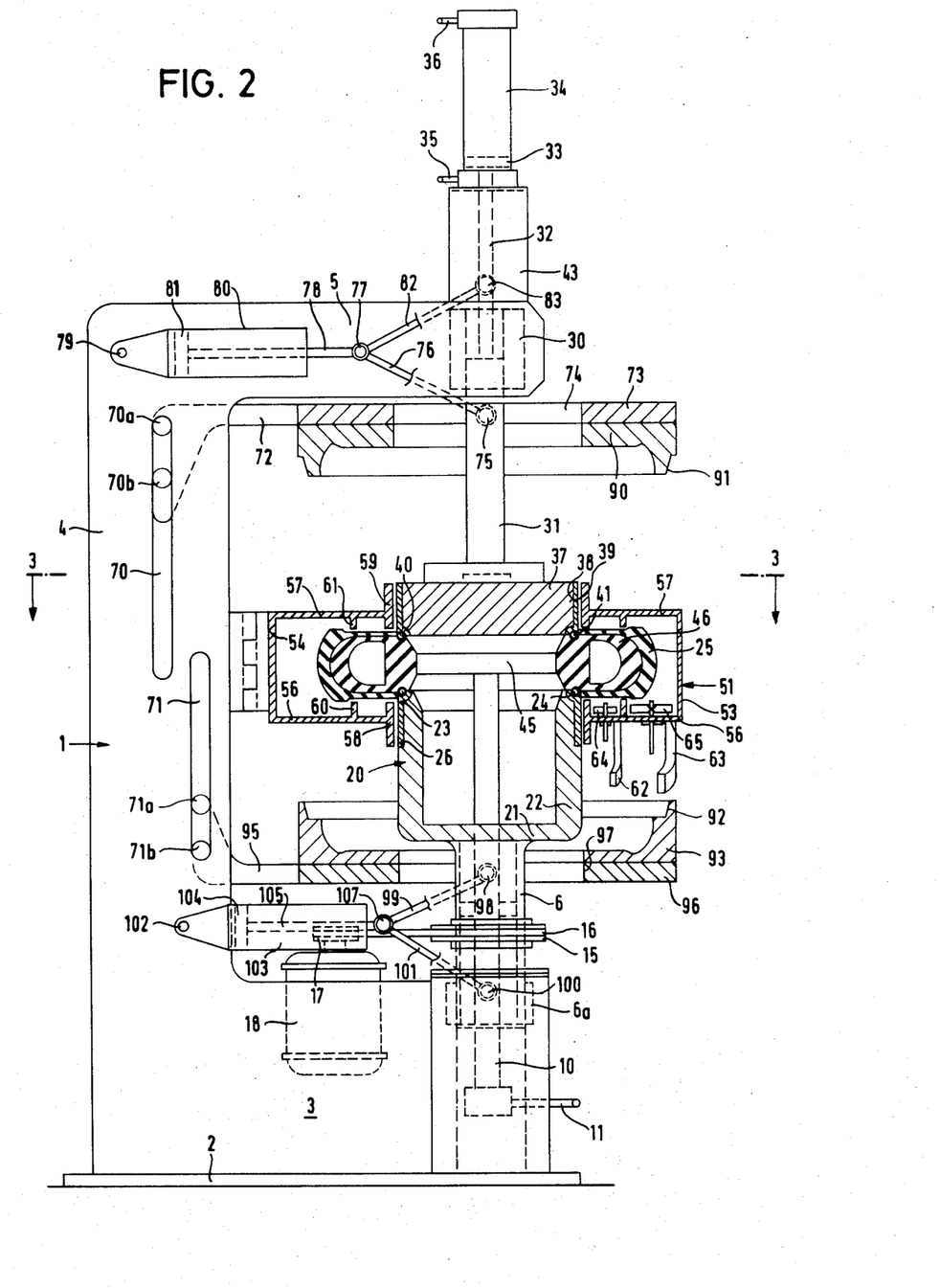
FIG. 2 is a view similar to FIG. 1 with the sectional portion taken along line 2—2 of FIG. 3, illustrating the apparatus after the blank has already been shaped to the toroidal configuration and is surrounded by the preheating chamber.
Figure 3:
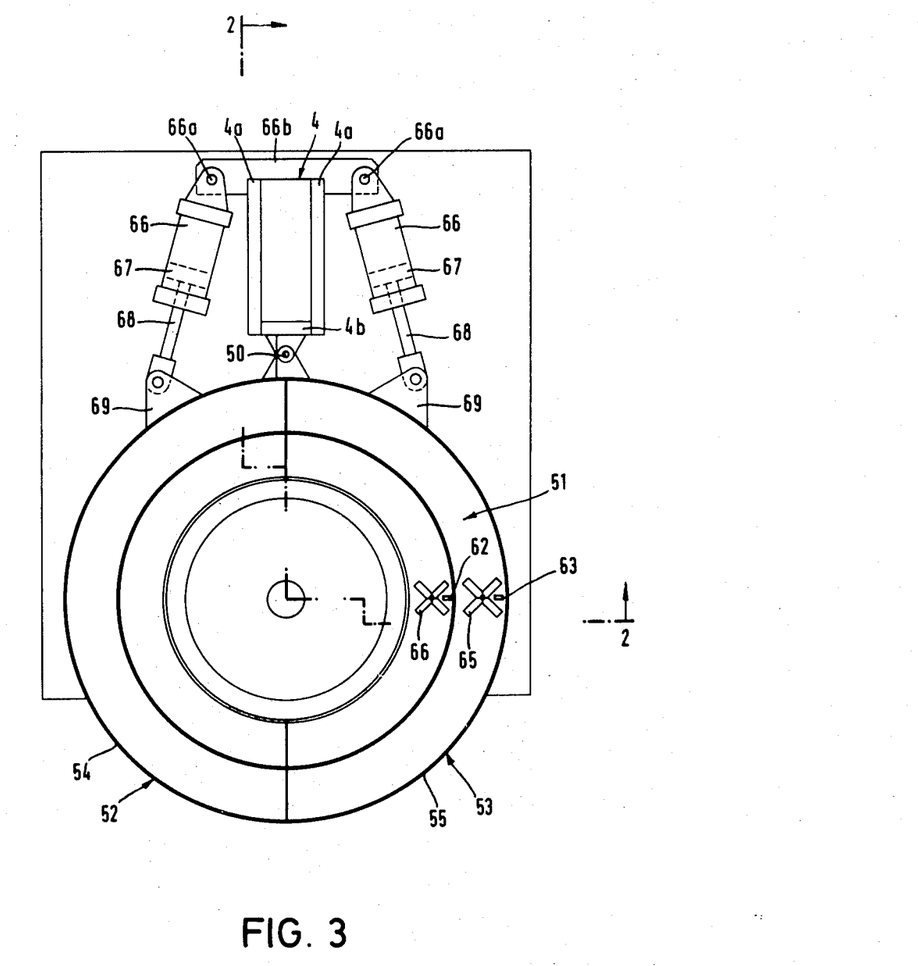
FIG. 3 is a sectional view taken along line 3—3 of FIG. 2.
Figure 4:
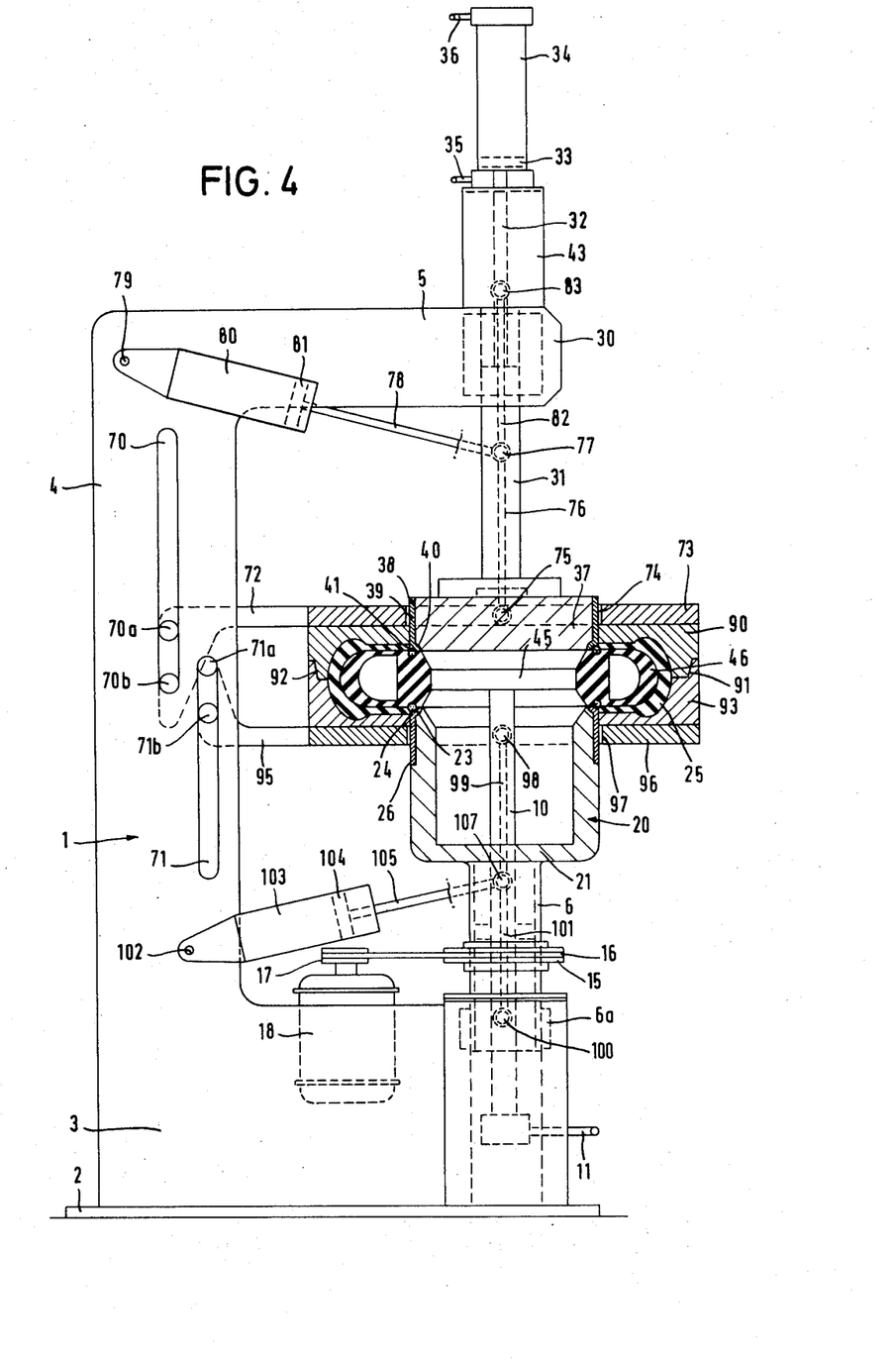
FIG. 4 is a view similar to FIGS. 1 and 2, illustrating the apparatus, when the parts of the vulcanizing mold make contact with the tire blank.
Figure 5:
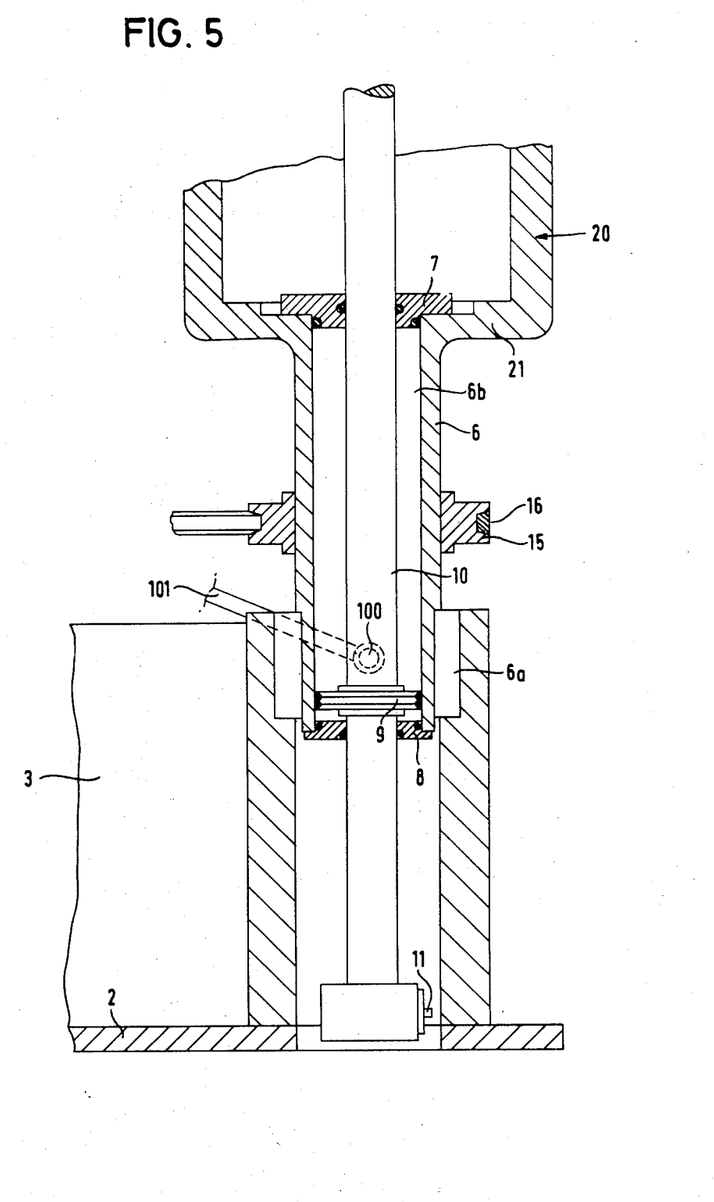
FIG. 5 shows, on a larger scale, in cross section, details of the apparatus.

The presently preferred embodiment of the invention, as illustrated in FIGS. 1 to 5, comprises a C-shaped frame 1 that rests on a foundation plate 2. That frame includes a lower beam 3 at the left end of which, as shown in FIGS. 1, 2 and 4, is connected a vertical column-like frame component 4, at the upper end of which is connected an upper beam 5 which runs parallel with lower beam 3. Frame component 4, as shown in FIG. 3, is made up of two side plates 4a, the inner edges of which are connected to an end plate 4b.

At the free end of the bottom beam 3, there is a vertical shaft 6 which is supported by a bearing 6a. Shaft 6 is hollow and forms in its interior, as shown especially in FIG. 5, a cylinder 6b, which is closed by upper cover 7 and lower cover 8. Between these two cylinder covers 7 and 8 is a sliding piston 9 which can be activated reciprocally by the pressuring agent that is fed to cylinder 6b. Piston 9 is equipped with rod 10 which travels through cylinder covers 7 and 8. The rod 9 has an axial bore and the rod is provided at the bottom with a connection 11 for a pressuring medium.

A belt sheave 15 is supported on shaft 6 in spaced relationship above lower beam 3. The lower beam 3 also supports an electric motor 18, the rotation axis of which runs parallel with shaft 6. On the top side of motor 18 is affixed a V-belt sheave 17, which, by means of the V-belt 16, drives sheave 15 on shaft 6.

Shaft 6 has a pot-shaped member 20 fastened to the top thereof to serve as part of a holder for a tire blank. The member 20 has a circular shaped bottom portion 21 that is provided with an opening to accommodate piston rod 10. To the edge of bottom portion 21 is connected a peripheral wall 22 which concentrically surrounds shaft 6 and is directed upwardly away from the belt sheave 15. The upper outer surface of that peripheral wall has an arched circular shoulder 23 to accommodate bead wire containing portion 24 of tire blank 25. The peripheral wall 22, within the range of shoulder 23 and beginning with it, is fitted on a portion of its outer surface with a coating 26 that is impervious to and reflects ultra-high frequency energy. The coating can be made of brass, for instance. Said outer surface can be fitted with a seal, the purpose of which will be indicated later.

The piston rod 10 that traverses the bottom portion 21 of the member 20 supports at its top a spoked structure 45, the spokes of which can be adjusted lengthwise in a radial sense. This is made possible by having each spoke comprise a cylinder, not shown, within which a piston slides and the rod of which is fastened inside of a bladder 46. In the starting position of the apparatus, the upper end of piston rod 10 and, therefore, the spoke-shaped structure 45, with the attached bladder 46, are positioned inside of the member 20 that serves as a holder. The interior of bladder 46 is connected with the bore through the piston rod 10 via the spoke-shaped structure 45 and it, therefore, can be supplied with the pressuring medium through the connection 11 on that rod.

In the free end of the upper beam 5 of the frame 1 is a bushing 30 in which slides a pressuring rod 31 which is connected with piston 33 of cylinder 34 via piston rod 32. Cylinder 34 has end fittings 35 and 36 for the passage of a pressurizing agent and is supported on the upper side of the upper beam 5 of frame 1 by an intermediate member 43.

At the bottom of the pressuring rod 31, which moves upward and downward, there is supported a turnable disc-like holder 37. This latter, on its peripheral edge facing member 20, has a rounded ring-like shoulder 40 intended to accommodate the second bead 41 of the tire blank 25. That circumferential shoulder 40, together with the entire peripheral surface 38 of the holder 37, is covered with a coat 39, such as, for instance, brass, which is impervious to and reflects ultrahigh frequency energy.

As shown especially in FIG. 3, two housing sections 52-53, which together form an approximately cylindrical preheating chamber 51, are linked together at the location identified as 50 on the front plate 4b of frame element 4. These two hinged sections swing around an axis that runs parallel with the axis of shaft 6 and of the preheating chamber 51. Housing section 52 comprises a half-round curtain wall 54 that extends through an arc of 180°, while housing section 53 comprises a corresponding curtain wall 55.

At the bottom edge of each curtain wall 54, 55, there is a lower end wall 56 which reaches radially toward the interior. Likewise, at the upper edge of curtain walls 54,55 there is an upper end wall 57 which is radially directed toward the interior. Both end walls 56 of the housing sections 52,53, which run transversely to the axis of the preheating chamber 51, are fitted at their radially inside edges, with a circular wall 58 which runs concentrically with curtain walls 54-55, respectively, and which overhangs below as well as above the end walls 56. In a similar manner also the upper end walls 57 are each connected at their inner edges with a circular wall 59 which overhangs that end wall 57 above and below and runs concentrically with curtain walls 54, 55.

Concentrically with curtain walls 54, 55, on the top side of each lower end wall 56, is to be found an intermediate wall 60 which terminates in spaced relationship above the end walls 56. Aligned with that intermediate wall 60, on the undersides of the upper end walls 57 that face the intermediate wall 60, there is also an intermediate wall 61 which extends a small distance below the end walls 57. In place of the intermediate walls 60,61 which constitute the zones surrounding concentrically the longitudinal axis of the preheating chamber 51, one may install many more intermediate walls so as to form more zones.

Two energy suppliers 62, 63, of varying strength, are introduced through the lower end wall 56 of the housing section 53 of the preheating chamber 51, parallel with the axis of the latter. The weaker energy supplier 62 enters radially inwardly of the intermediate wall 60 while the stronger energy supplier 63 enters the chamber 51 radially outwardly of that wall 60. The nozzle opening of supplier 62 is wiped by an impeller 64 which is made of a metal that reflects radiation, such as, for instance, brass, and which turns around an axis that is laterally displaced in relation to the nozzle opening. The nozzle opening of supplier 63 is wiped by impeller 65 which also rotates around an axis adjacent to that opening.

On the outside of each curtain wall 54,55, there is affixed a bracket 69 which is pivotally connected with piston rod 68. Each piston rod 68 extends into a cylinder 66 where it connects with a piston 67 that slides in the cylinder. The closed end of each cylinder 66 is pivotally connected by a pin 66a with crossbar 66b, shown only in FIG. 3, which is attached to the vertical member 4 of the frame.

Curtain walls 54,55, end walls 56,57, intermediate walls 60,61 and circular walls 58,59 are made of a radiation reflecting material, such as brass, or at least coated with it.

Each side plate 4a of the vertical frame members 4 is provided with two guiding slots 70, 71, parallel to each other and extending vertically. In each of the slots 70 are introduced two spaced guiding rollers 70a and 70b which are fastened to an arm 72 that runs transversely to the axis of shaft 6. Arm 72 supports a ring-shaped pressure plate 73 which has a circular opening 74 concentric to the axis of shaft 6 and of slightly larger diameter than holder 37.

Pressure plate 73 is equipped with two swivelling studs 75 which are located diametrically opposite to each other, are aligned parallel with guiding rollers 70a and 70b, and project outwardly from the peripheral wall of pressure plate 73. A lever 76 is linked to each stud 75. Each lever 76 is swingingly connected, by means of bolt 77, with the free end of a piston rod 78 which extends into a cylinder 80 where it connects with a piston 81. The cylinders are hinged on frame member 4 at a point marked 79. Furthermore, by means of the bolts 77, levers 82 are each swingingly joined at one end with the free end of one of the piston rods 78 of cylinders 80. The other ends of each of the levers 82 is connected to one of the two bolts 83 which lie parallel with the pivot studs 75 and which project radially outwardly from the outer surface of the intermediate member 43 that supports cylinder 34.

On the lower side of pressure plate 73 is fastened a circularly-shaped part 90 of a vulcanizing mold which conforms in its inner and outer diameters to plate 73. Part 90, on its underside, has a suitable surface for molding the tire blank 25 and is equipped with a conical centering flange 91 which is intended to fit into a corresponding circular recess 92 provided in a second portion 93 of the mold.

The conjugated guiding slots 71 of the lateral plates 4a of frame member 4 each have two guide rollers 71a, 71b inserted therein which are fastened to an arm 95 that extends transversely of the axis of shaft 6. That arm 95 carries a circular bottom pressure plate 96 that has a round opening 97. The diameter of this latter opening is only slightly larger than the outer diameter of the member 20. The bottom pressure plate 96 is solidly connected with two pivot studs 98, diametrically directed toward each other, which run parallel with guiding rollers 71a and 71b and project outwardly from the peripheral surface of pressure plate 96. To each stud 98 is pivotally connected a lever 99. In addition, two pivot studs 100 are attached on the outer surface of the free end of the lower beam 3. The studs 100 are diametrically arranged in relation to the axis of shaft 6 and in a parallel direction in relation to studs 98. A lever 101 is also connected to each stud 100.

The lower portion of frame member 4 has a cylinder 103 pivotally attached on each side by means of a stud 102. Each cylinder incorporates a piston 104 and a corresponding piston rod 105. The free end of each piston rod 105 is connected to a bolt 107 which establishes a pivotal joint between the end of the respective piston rod 105 and a lever 99,101 arranged respectively on the same side of the frame member 4 as the piston rod to which it attached.

On the upper side of the pressure plate 96, there is fastened a second section 93 of the curing mold which is also circular in shape and the inner and outer diameters of which fit those of plate 96. The top side of mold section 93 features a surface that is intended to impart the appropriate shape to the tire blank. This mold section is also fitted with a circular recess 92 to accommodate the centering flange 91 of the opposite mold section 90.

In the operation of the apparatus illustrated in FIG. 1 to 5, piston 33 and its dependent movable holder 37 are initially in their extreme top position. In such a position, a hollow cylindrical tire blank 25 can be deposited with its bottom bead fitted onto the circular shoulder 23 of the member 20. Thereupon, the blank 25 is made fast by a short downward motion of holder 37 so that the apparatus assumes the position shown in FIG. 1. Subsequently, piston rod 10, which passes through the bottom portion 21 of the member 20, travels upwardly until its spoke-shaped structure 45, with the attached bladder 46, comes to rest in the longitudinal center of the hollow cylindrical blank 25, as represented by the dash-dot lines in FIG. 1. Thereupon, the bladder 46 is fed a pressurizing fluid through the connection 11 and is thus inflated. Simultaneously, piston 33 of cylinder 34 is activated by fluid pressure and moves holder 37 in the direction of member 20. As a result, the tire blank 25 is pressed outwardly at its longitudinal center and the bladder, together with the longitudinal center of blank 25, travel downwardly until they reach the position shown in FIG. 2, piston rod 10 performing a corresponding backward motion.

In the position shown in FIG. 2, the blank 25 has assumed its fully toroidal shape and can now be preheated. For this purpose, housing sections 52 and 53, which, at the outset, were swung open, are now closed by the sliding motion of piston rods 68 moving out of cylinders 66, so that a completely enclosed preheating chamber 51 is formed around blank 25. The inside surfaces of circular walls 58, 59 can be thereby brought into contact with seals that are affixed on the shell surfaces of the member 20 and of holder 37, thus hermetically closing the preheating chamber. The intermediate walls 60 and 61 now lie very close to the outer side of the toroidal blank 25, once the chamber 51 is closed, and thereby form two compartments or zones for the admission of differing amounts of ultra-high frequency energy.

Upon the closing of chamber 57, the electric motor 18 is turned on and this sets in motion, by virtue of belt 16, the sheave 15, the shaft 6, and the member 20, which, in turning, rotates the blank 25, the bladder 46 and the holder 37. Now also, impellers 64 and 65 are rotated to scatter the ultra-high frequency energy which is admitted in different amounts, into the zones of chamber 51 through the energy suppliers. Beads 24 and 41 of the tire blank 25 are amply protected from that energy by the circular walls 58 and 59.

By reason of the introduction of ultra-high frequency energy in differing amounts into the two zones of chamber 51, the portions of blank 25 which are enclosed in those zones are preheated to different degrees. Obviously, it is possible to subdivide chamber 51 into more than just two zones, if this is required by the differing heat needs of each different portion of blank 25. However, it is also conceivable that no dividing walls are necessary if all portions of a blank demand approximately the same amount of heat.

Upon completion of the preheating of blank 25, the pistons 67 of cylinders 66 are activated in such a way that piston rods 68 move inwardly and chamber 51 is again opened. Now pistons 81 of cylinders 80, as well as pistons 104 in cylinders 103, are activated by a pressuring medium so that piston rods 78 and 105, of cylinders 80 and 103, respectively, are moved outwardly of their cylinders.

The motion of piston rods 78 causes levers 76 and 82 to be spread farther apart, whereby the pivot studs 75 are moved downward along with pressuring plate 73. In a similar manner, the outward motion of piston rods 105 cause pivot studs 98 and also pressuring plate 96 to move upward. Both those pressuring plates 73 and 96, with mold portions 90 and 93 attached thereto, while guided by rollers 70a, 70b, 71a and 71b, moving in parallel paths, are moved toward each other to such an extent that they assume their vulcanizing position shown in FIG. 4, whereby both portions 90 and 93 of the vulcanizing mold engage the outer surface of blank 25. In this position, the centering flange 91 of the upper portion of mold 90 engages in the recess 92 in lower mold portion 93.

To perform the vulcanization of blank 25, mold portions 90 and 93, as well as bladder 46, are heated with steam. For the sake of simplicity, the installation and piping needed for this purpose are not shown here.

Within a short time, the entire tire blank 25 in the mold attains approximately the same degree of vulcanization at all points of its cross section. Now, both portions 90, 93 of the vulcanizing mold are brought back to their initial position. Bladder 46 is then collapsed by the application of a reduced pressure through the fitting 11. Now holder 37 is lifted by returning piston 33 to its initial position. Furthermore, the spokes of structure 45 are gathered together in a radial sense, and that structure along with bladder 46, are brought back, by the downward motion of piston 9, and piston rod 10, into their starting position inside of the member 20. Then it becomes possible to remove the vulcanized and fully shaped tire from the apparatus.

Figure 6:
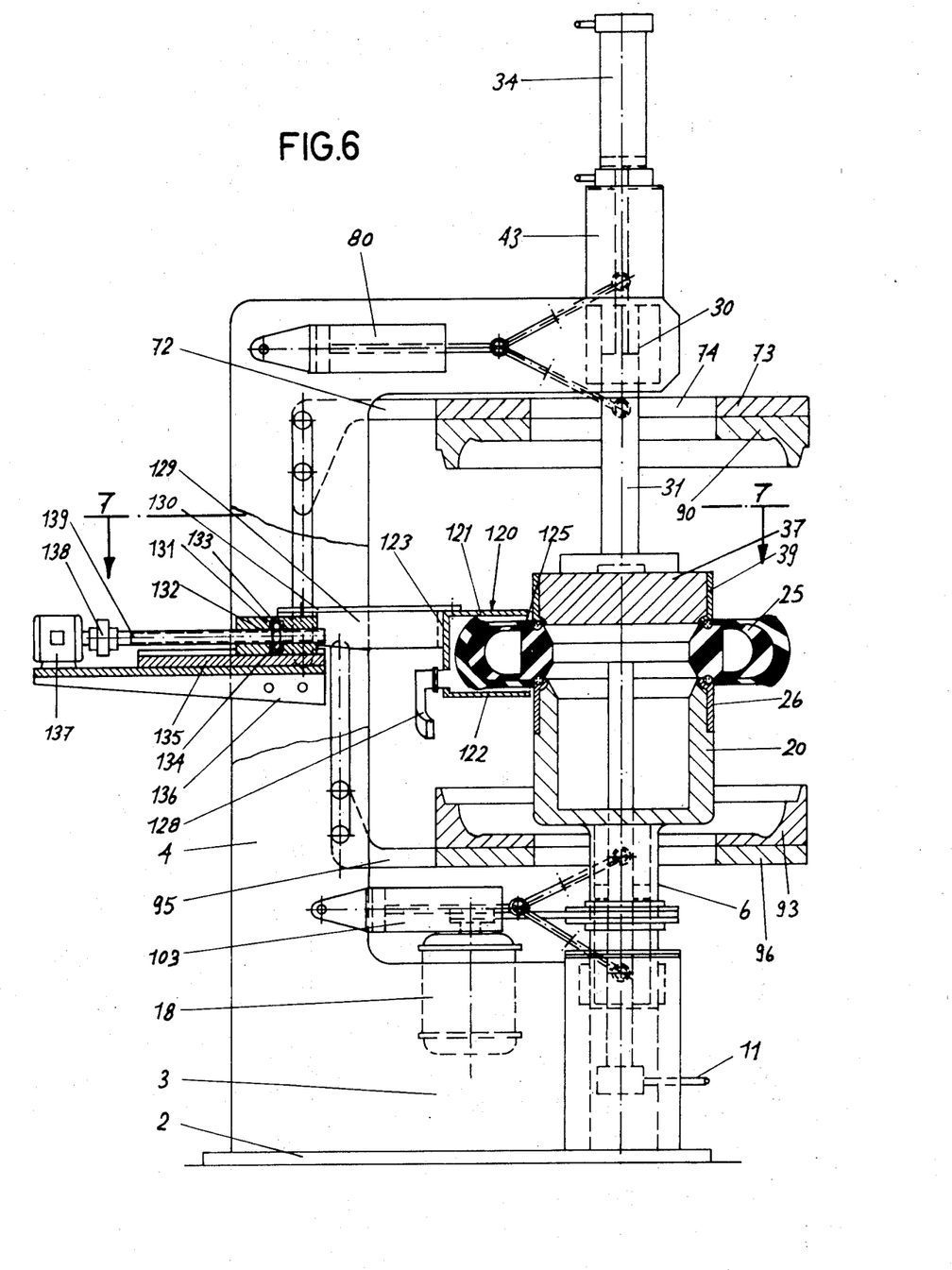
FIG. 6 is a view, partially in side-elevation and partially in axial section along line 6—6 of FIG. 7, illustrating a second embodiment of the invention.
Figure 7:
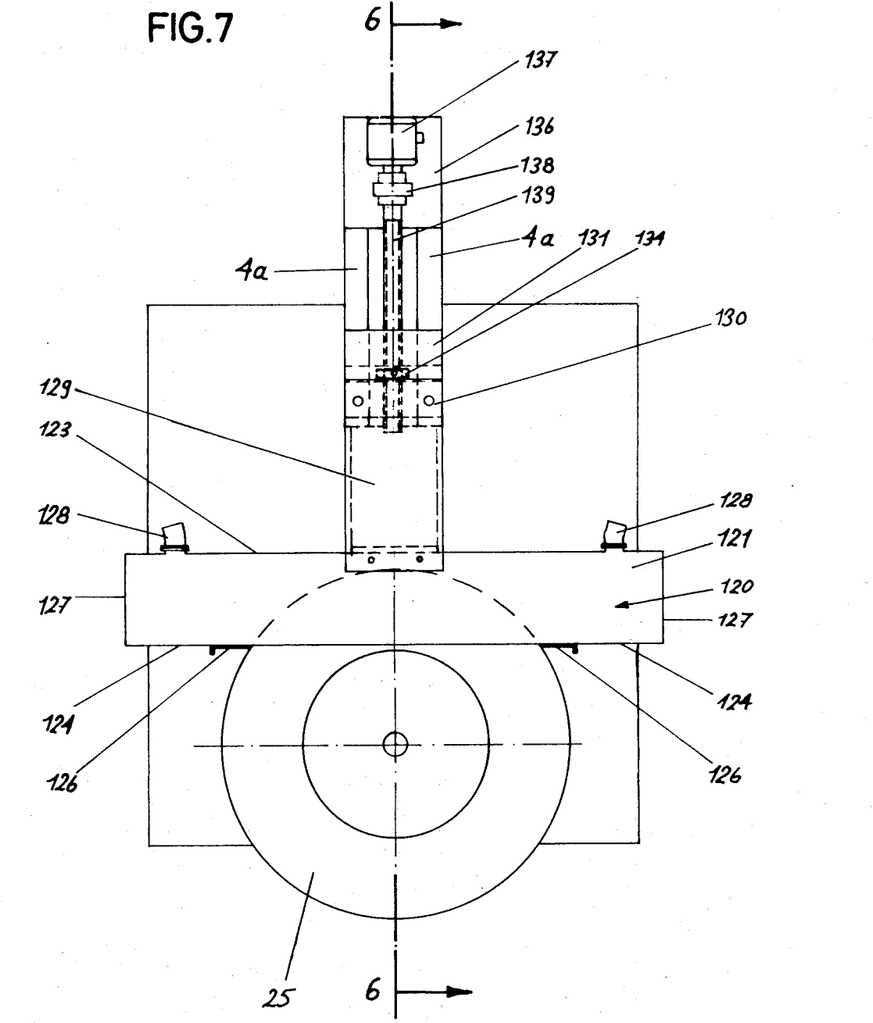
FIG. 7 is a sectional view along line 7—7 of FIG. 6.

The construction of the apparatus, as illustrated in FIGS. 6 and 7, differs from the one described above merely in regard to the design and the functioning of the preheating device which, in this case, is built in the shape of a box-like preheating chamber 120 and can be moved radially in relation to the axis of the tire blank 25 which is being held by the member 20 and holder 37.

As shown in FIG. 6, the box-like preheating chamber 120 has a rectangular hollow cross section and a rectangular cover plate 121 which lies in a plane that runs normally in relation to the axis of shaft 6. Below cover plate 121 is a rectangularly shaped bottom plate 122 which runs parallel with the cover plate. Both these plates 121 and 122 are joined together by a rear wall 123 which extends normally in relation to them. Parallel with rear wall 123 of chamber 120, on the side facing the tire blank, are two front wall sections 124 which close off the front side of chamber 120 at its ends. Between the adjacent edges of the front wall section 124, there is an opening 125 the length of which may be determined by the sliding members 126 schematically illustrated in FIG. 7, since the construction is such that these sliding members 126 can be moved beyond the adjacent edges of the front wall sections 124. The height of opening 125 corresponds to the distance between the cover plate 121 and the bottom plate 122. Chamber 120 is closed off at both its ends by rectangular end plates 127 which run parallel to each other. Two ultra-high frequency energy suppliers 128 are conducted through the rear wall 123 of chamber 120 for the preheating of blank 25.

A support 129, which runs substantially in a radial direction relative to the axis of shaft 6, is joined to the rear wall of the chamber 120. A guiding member 131 is solidly attached to that end of support 129 which is opposite chamber 120. The guiding member 131 has a spindle passage 132, as well as a receptacle 133, to hold a spindle nut 134 in a non-rotational manner. Guiding member 131 slides on a track 135 radially disposed in relation to the axis of shaft 6. Track 135 is supported by a bracket 136 which is attached to the vertical frame member 4, between its lateral plates 4a, and projecting from it. Bracket 136 carries on its free end an electric motor 137, which drives a threaded spindle 139 (by way of a coupling 138) which in turn penetrates spindle passage 132 of guiding member 131 and is screwed into the spindle nut 134 held stationary in relation to the guiding member 131. Hence, the turning of spindle 139 in one direction causes the guiding member 131, the support 129 and the chamber 120 to be shifted in the direction of the motor 137, while the turning of spindle 139 in the other direction causes the chamber 120, with its associated parts, to be shifted in the direction of shaft 6.

When using this apparatus, after a tire blank 25 has been inserted into it and given the toroidal shape, in conformity with the operational method applicable to the apparatus illustrated in FIGS. 1 to 5, the box-like chamber 120 is moved forwardly, by turning of the spindle 139, performed with the aid of the motor 137, the movement being from the idle position, where the chamber is immediately next to the vertical frame member 4, until the forward edges of the cover plate 121 and of the bottom plate 122 come to rest in the immediate vicinity of holder 37 and of the member 20, respectively. Thus, the cover plate 121 will be slightly above and bottom plate 122 slightly below the shaped tire blank 25. If this should not be achieved, slides 126 are subsequently moved toward each other to such an extent as to leave free only a small slit between the housing and the adjacent portion of the blank 25.

In this position, in which a segment of tire blank 25 finds itself in the box-like chamber 120, blank 25 is rotated around its axis, as in the case of the apparatus already described, so that, consecutively, all its segments are moved around throughout that chamber. Simultaneously, the ultra-high frequency energy is fed through supply outlets 128 and, hence, the blank is subjected to the effects of that energy. In this manner, the blank is preheated as desired, and in the shortest possible time.

As soon as the desired preheating of the blank has been attained, motor 137 is set in reverse motion. As a consequence, by virtue of spindle 139, the guiding member 131, the carrier 129 and the preheating chamber 120 are drawn back and, therefore, the blank 25 is set free from chamber 120, and segments 90 and 93 of the curing mold can take hold of it. The further handling of the blank 25 is performed in the same manner as indicated for the apparatus illustrated by FIGS. 1 to 5.

It will be observed that both constructions of the apparatus embody the same basic concept, namely, that the tire blank 25 is to be placed in only one apparatus for effecting toroidal shaping, preheating and vulcanization without transporting the blank from one place to another.

I claim:

1. An apparatus for shaping and vulcanizing an uncured elastomer-containing tire comprising separable tire molding portions, means to support an uncured tire in a hollow, generally cylindrical configuration between said molding portions and shape the tire to a generally toroidal configuration while the said molding portions remain spaced from the tire, tire preheating means movable between said tire molding means to and from enclosing relationship with at least a portion of the toroidally shaped tire, and means to move said molding means into engagement with the preheated tire.

2. An apparatus according to claim 1 characterized in that the tire preheating means comprises a chamber provided with at least one emitter of ultra-high frequency energy.

3. An apparatus according to claim 2 comprising means to rotate the tire within said chamber.

4. An apparatus according to claim 2 characterized in that the said chamber has partition means impenetrable by ultra-high frequency energy dividing the chamber into zones, each adapted to cooperate respectively with one part of the uncured tire, and a separate ultra-high frequency energy emitter in each of said zones.

5. An apparatus according to claim 2 characterized in that the preheating chamber comprises two relatively movable portions hingedly supported for swinging movement about an axis parallel to the axis of the tire supported in the apparatus.

6. An apparatus according to claim 2 characterized in that a metallic impeller is disposed in said chamber adjacent each ultra-high frequency energy emitter operable to diffuse the emitter energy through the respective zone.

7. An apparatus according to claim 4 characterized in that the zone-creating partition means are so disposed that the zones are concentric about the axis of a tire in the apparatus.

8. An apparatus according to claim 7 characterized in that the partition means extend from the wall of the chamber and terminate closely adjacent a tire in the chamber.

9. An apparatus according to claim 7 characterized in that the said chamber is generally cylindrical with the said partition means extending from the end walls of the chamber and terminating closely adjacent the curved sidewalls of a shaped tire in the chamber.

10. An apparatus according to claim 2 characterized in that the said chamber encloses a portion only the circumference of the shaped tire and the apparatus further comprises means to rotate the tire thereby sequentially moving all portions of the tire circumference through the chamber.

* * * * *

UNITED STATES PATENT OFFICE
CERTIFICATE OF CORRECTION

Patent No. 3,788,785          Dated January 29, 1974

Inventor(s) Joseph Gerard Alphons Smeets

It is certified that error appears in the above-identified patent and that said Letters Patent are hereby corrected as shown below:

Column 2, line 56, change "vulcanizing temperature" to ---vulcanization---.

Signed and sealed this 9th day of July 1974.

(SEAL)
Attest:

McCOY M. GIBSON, JR.          C. MARSHALL DANN
Attesting Officer              Commissioner of Patents